United States Patent [19]

Hayes et al.

[11] Patent Number: 4,760,597

[45] Date of Patent: Jul. 26, 1988

[54] TECHNICIAN SET-UP UNIT FOR AND METHOD OF CABLE TELEVISION CONVERTER INSTALLATION AND ADDRESS ASSIGNMENT

[75] Inventors: John J. Hayes; Richard F. Boulé, both of Chesapeake, Va.

[73] Assignee: General Electric Company, Portsmouth, Va.

[21] Appl. No.: 723,776

[22] Filed: Apr. 16, 1985

[51] Int. Cl.[4] .................... H04N 7/167; H04N 7/10; H04H 1/00

[52] U.S. Cl. .................... 380/10; 358/86; 358/349; 380/13; 380/20; 455/4

[58] Field of Search .................... 358/122, 114, 84, 86, 358/349; 178/22.08; 455/2, 3, 4, 5, 6; 380/10, 20, 23

[56] References Cited

U.S. PATENT DOCUMENTS

| | | | |
|---|---|---|---|
| 3,990,012 | 11/1976 | Kames | 455/2 |
| 4,259,720 | 3/1981 | Campbell | 178/22.08 |
| 4,489,419 | 12/1984 | Wang | 455/3 |
| 4,531,020 | 7/1985 | Wechselberger et al. | 358/122 |
| 4,536,791 | 8/1985 | Campbell et al. | 358/122 |
| 4,588,464 | 12/1985 | O'Brien, Jr. | 455/5 |
| 4,599,647 | 7/1986 | George et al. | 358/114 |
| 4,673,976 | 6/1987 | Wreford-Howard | 380/10 |
| 4,677,467 | 6/1987 | Hayes | 358/349 |

*Primary Examiner*—Stephen C. Buczinski
*Assistant Examiner*—Linda J. Wallace
*Attorney, Agent, or Firm*—Carlos Nieves; Richard G. Coalter; Peter M. Emanuel

[57] ABSTRACT

A technician set-up unit is described for cable television converter installation and address assignment, and a method for using the unit with an addressable television converter. The set-up unit and method permits address assignments to be made in a convenient and easy manner by the CATV operator, thus avoiding address assignment during manufacture. The technician set-up unit, which is portable, forms a hardware link between the converter and addressing computer. Using the technician set-up unit as an intermediary device, data can be downloaded to the converter by the addressing computer to define the converter address and to establish the appropriate level of service. The benefit of the invention also permits the technician set-up unit to verify proper converter installation.

21 Claims, 14 Drawing Sheets

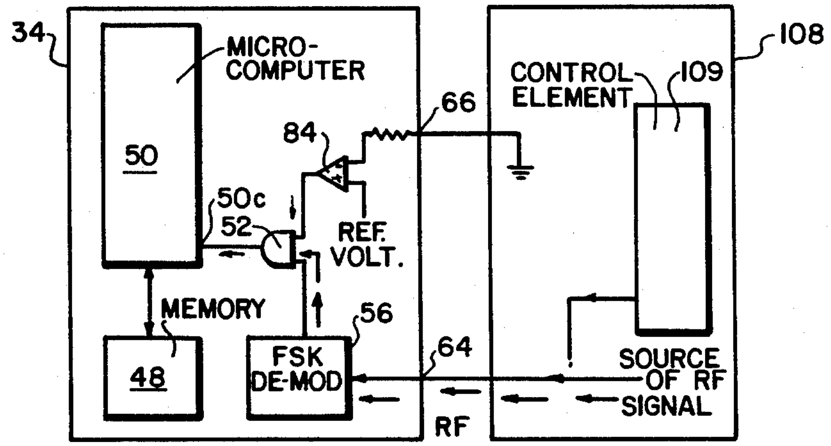
FIG.10
FIG.11
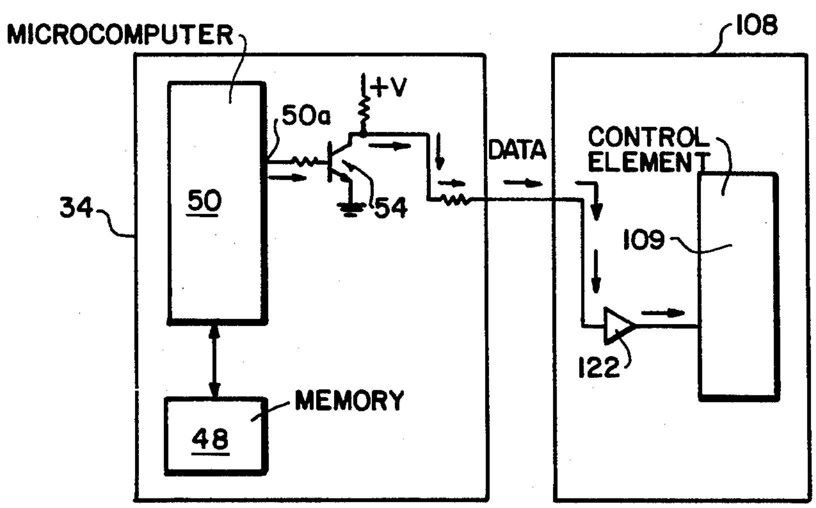

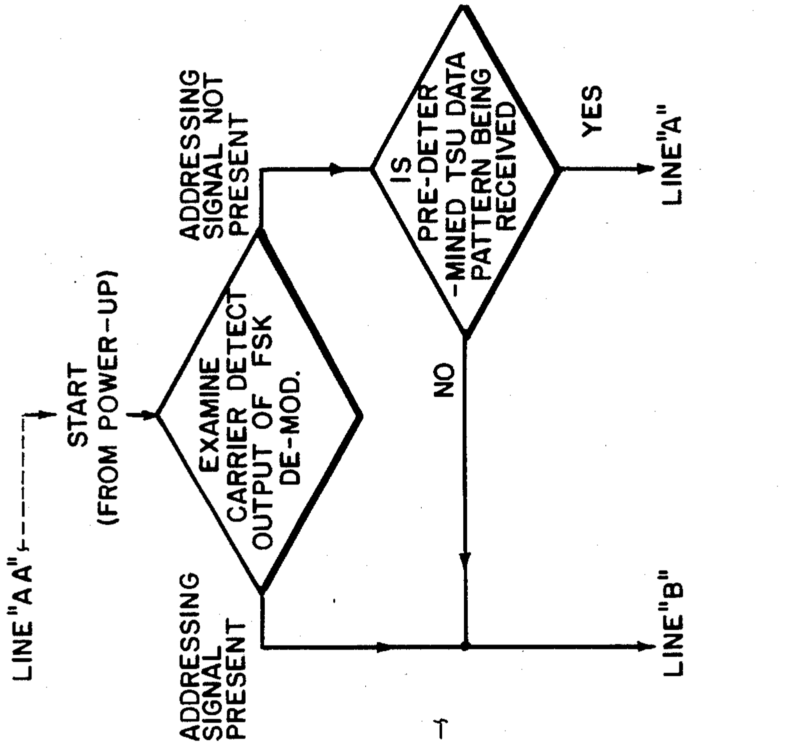
FIG.13
FIG.14
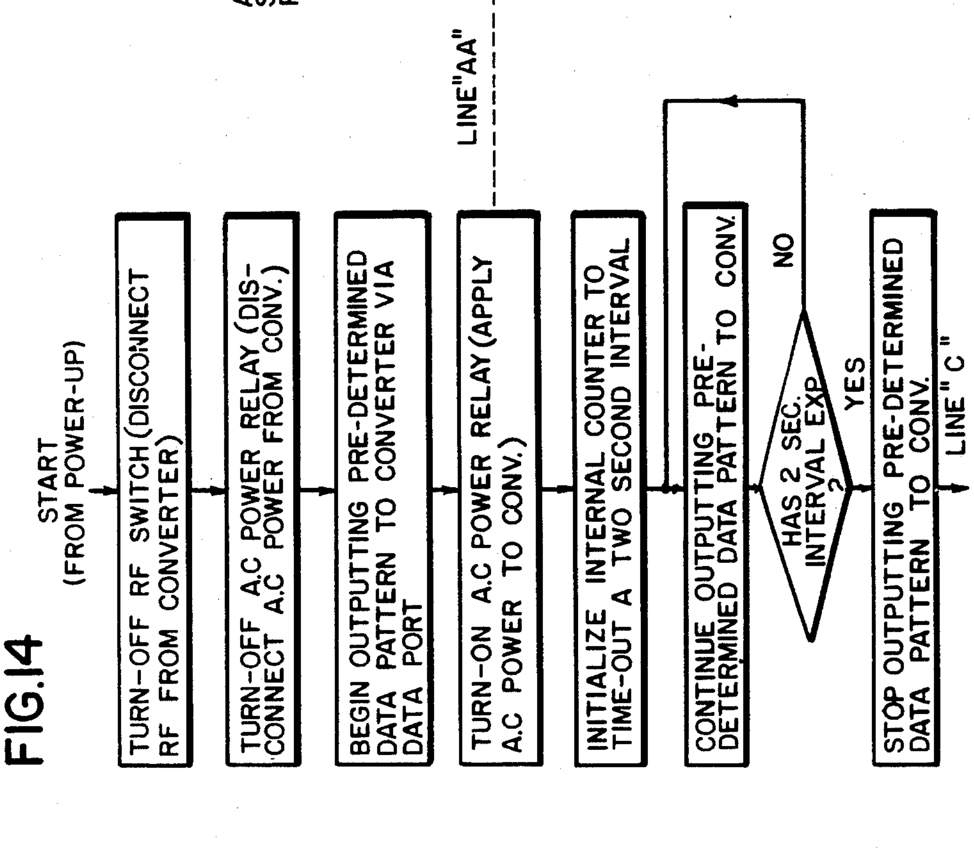

TECHNICIAN SET-UP UNIT FOR AND METHOD OF CABLE TELEVISION CONVERTER INSTALLATION AND ADDRESS ASSIGNMENT

The following specification includes subject matter which is also disclosed in U.S. Pat. No. 4,677,467 entitled CATV ADDRESSABLE CONVERTER WITH MULTI-PURPOSE, BI-DIRECTIONAL SERIAL DIGITAL DATA PORT, filed Apr. 16, 1985, which issued June 30, 1987, and is assigned to the Assignee herein.

BACKGROUND OF THE INVENTION

1. Field of the Invention

This invention generally relates to television signal distribution systems, and more particularly, to a device for and method of facilitating the installation of and address assignment for television converters.

2. Description of the Prior Art

Modern CATV systems employ in-house converters which can accept and process digital data emanating from a computer in a CATV head end. This digital data conveys commands which can enable/disable a converter, control the availability for viewing of channels and implement other ancillary functions as well. A CATV system in which a computer (Addressing Computer) can transmit commands to converters and the converters cannot return data to the computer is called a one-way addressable system.

Addressable CATV converters store digital data in an internal memory which defines the converter address and level of service to be provided to the subscriber.

Existing converters have a number of disadvantages. Establishing an address for the converter is a time consuming and expensive procedure to the manufacturer of the converter and/or the cable operator. Two basic approaches have been used. One approach is for the manufacturer of the converter to program data into non-volatile memory to store converter addresses. Another approach is for the manufacturer to ship converters to cable operators in a "blank" state, i.e. not yet having been assigned an address. The cable operators, however, are required to uncrate the converters, take them out of the boxes, remove the converter covers, remove the memory IC's in the converters, insert the IC in an independent test fixture and program a digital code into the IC. This can impose significant labor costs. In such instances, the cable operator must choose the code or address and maintain a record of the addresses applied to each converter. The application of the addresses by the cable operators raises the possibility of damage to the IC and/or the otherwise operable converter itself. With the latter approach, the cable operator is required to maintain very up-to-date and accurate records of the assigned address so that the correlation between a given address and a converter can be checked or verified and that duplicate address assignments do not occur.

Furthermore, with existing converters, the accessing of the memory to verify data in memory essentially requires the same aforementioned process used by cable operators to initially imprint the address. Again, the process is time consuming and costly and raises the possibility of damage to the unit.

SUMMARY OF THE INVENTION

It is, accordingly an object of the present invention to provide a device for use with an addressable television signal converter which permits converter installation and/or address assignment which is completely controlled by a remotely located addressing computer.

It is another object of the present invention to provide a device for use with addressable converters which makes it convenient and easy for a CATV operator to assign addresses to the converter over a cable television system.

It is still another object of the present invention to provide a device which is connected to and forms a hardware link between an addressable CATV converter and an addressing computer to serve as an intermediary and which permits data from the addressing computer to be down loaded to the converter to assign the converter address and to establish an appropriate level of service.

It is yet another object of the present invention to provide a device which enables verification of proper converter installation.

It is an additional object of the present invention to provide a device which is connectable to an addressable television signal converter and which can demodulate, decode and process RF addressing commands sent from an addressing computer and communicate with the converter through a bi-directional data port.

It is also an object of the present invention to provide a method for assigning addresses to CATV converters and to enable proper verification of converter installations.

A technician set-up unit in accordance with the present invention is to be used with an addressable television signal converter having an RF input port and a data port and being responsive to a television signal distribution system remotely controlled by an addressing computer which generates coded RF command signals. The technician set-up unit includes an RF input port for receiving said RF coded command signals. An RF output port is provided which is connectable to the RF input port of the converter. A data port is connectable to the data port of the converter for receiving digital data signals from and sending digital data signals to said converter. The technician set-up unit includes control means responsive to said RF coded command signals for coordinating the exchange of RF and/or digital data signals between the converter and said technician set-up unit through the respective connected RF and data ports.

A method in accordance with the invention comprises the steps of interrupting RF signals to the RF input port of the converter, and inputting a predetermined data pattern to the converter through its data port. Power is subsequently applied to the converter while said data pattern is being inputted to the converter. The converter address data is loaded into the converter memory. Other data is loaded into the converter memory upon reinstatement of the RF addressing commands to the converter. The data is subsequently read which has been stored in the converter to verify proper installation. If the installation is verified, a final command is sent to the converter to render it operational. If verification fails, the converter is rendered inoperative.

BRIEF DESCRIPTION OF THE DRAWINGS

For a better understanding of the invention together with other and further objects, features and advantages thereof, as well as other characteristics of various embodiments thereof, reference is had to the following description taken in conjunction with the accompanying drawings in which:

FIG. 10 is similar to FIG. 6, but illustrating the equivalent circuit showing the data path when data is sent from an external device to the converter via the RF link;

FIG. 11 is similar to FIG. 6, but showing equivalent circuit illustrating the data path when data is sent from the converter to an external device using the digital data link;

FIGS. 13 and 14 are flow charts representing the software in the converter and technician set-up unit, respectively, illustrating the steps taken by the technician set-up unit to place the converter into a test mode and the steps taken by the converter to determine whether it should enter into the test mode, the flow charts being shown side-by-side to convey how the processing in the technician set-up unit and the converter are related in time;

DESCRIPTION OF THE PREFERRED EMBODIMENT

Figure 1:
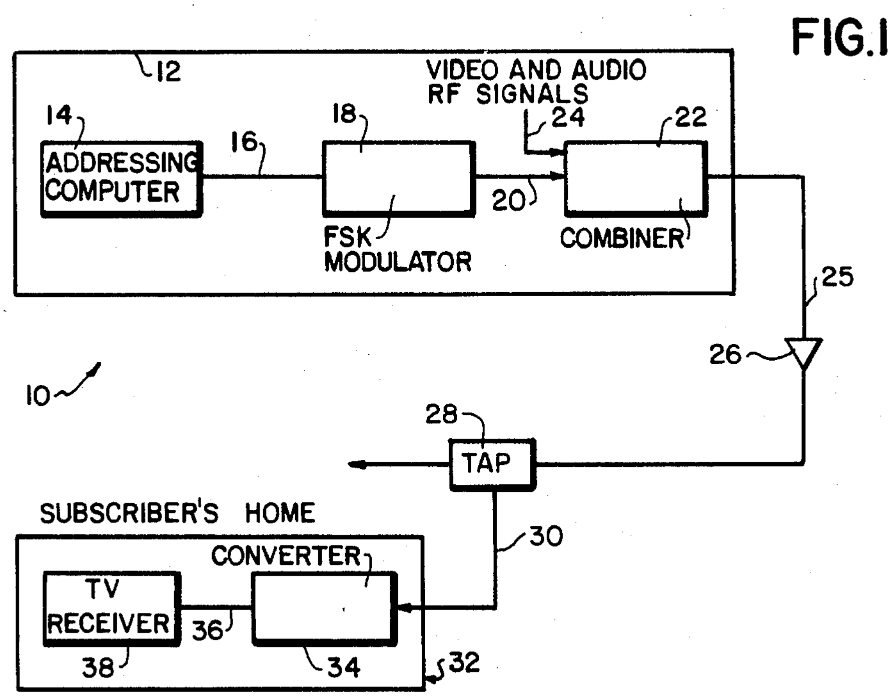
FIG. 1 is a simplified block diagram of a one-way addressable CATV system.

Referring now specifically to the drawings, in which identical or similar parts are designated by the same reference numerals throughout, and first to FIG. 1, there is shown a simplified block diagram of a one-way addressable system which is generally identified by the reference numeral 10.

The system 10 includes a head-end 12 at which all television, audio and addressing signals to be distributed are assembled. The head-end 12 includes an addressing computer 14 where addressing commands are generated. The addressing computer 14 outputs a signal which controls the state of all of the addressable converters in the CATV system. The output of the computer 14 is a digital signal which conveys bits of information in a serial fashion. The bits are transmitted in groups, or packets, to form addressing commands. The signal outputted by the addressing computer 14 is referred to as the "baseband" addressing signal. Addressing commands transmitted by the addressing computer control the level of service delivered by each converter within the CATV system.

The baseband addressing signal is not directly suitable for transmission on the CATV distribution system. Typically, digital data is conveyed on a one-way addressable cable system using a technique called Frequency Shift Keying (FSK). FSK employs two closely spaced Radio Frequency (RF) carriers to convey each of the two possible digital states existing in the baseband signal. FSK approaches typically utilize two RF carriers which are separated by a predetermined frequency difference, such as 150 KHz.

In order to implement an FSK modulation scheme, the addressing computer 14 is shown connected by means of a cable 16 to an FSK modulator 18. The FSK modulator 18 accepts the baseband addressing signal as an input, and outputs an RF signal suitable for transmission on the CATV system.

The FSK modulator 18 is connected via a cable 20 by means of which the RF addressing signals are conveyed to a combiner 22. The combiner 22 includes an input 24 for receiving all video and audio RF signals for transmission over the CATV system. The combiner 22 sums all separate RF signals to create a signal for transmission. The output of the combiner 22 is connected to cable 25 which is used to distribute signals to CATV subscribers. Advantageously, amplifiers, such as amplifier 26, are located between cable lengths of the CATV distribution system to maintain acceptable signal levels. The cable 25 is connected to a tap 28 the output of which provides a cable drop 30 to, for example, a subscribers's home 32.

Inside the home 32, the input to the converter 34 is connected to the tap 28, while the output thereof is connected by means of a cable 36 to a television receiver 38. The converter 34 responds to the addressing commands to permit a subscriber to view programs that the subscriber has paid to view as well as to prevent other programs from being viewed.

Converter

Figure 2:
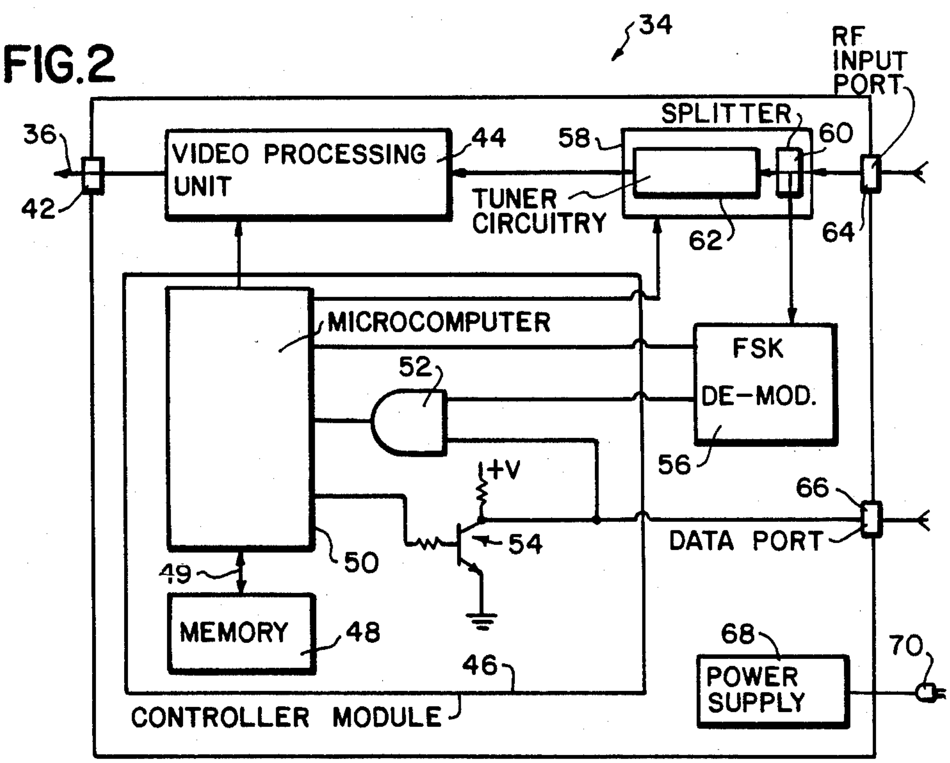
FIG. 2 is a block diagram showing the details of the converter shown in FIG. 1.

Referring to FIG. 2, there are shown the essential elements of the converter 34. The converter 34 has an RF output connector 42 over which the converter conveys all video/audio signals to the subscriber's television receiver 38 over the cable 36.

Connected to the RF connector 42 is video processing circuitry 44. This circuitry contains all of the circuitry conventionally required by the converter to process the video/audio signals, with the exception of the tuner. Details of the video processing circuitry are not critical for the purposes of the present invention and any suitable conventional video circuitry may be used.

A controller module 46 is provided which includes a digital memory 48, the memory content of which may be altered via commands delivered through an FSK demodulator 56 and data port 66, both to be more fully described hereafter. The data content can be read by an external device (discussed below) via commands issued through the data port 66. The controller module 46 also includes a micro-computer 50, and an AND gate 52 which transfers the commands from either the FSK demodulator 56 or data port 66 to the micro-computer 50. Numerous micro-computers can be used for this purpose. One example of a suitable micro-computer IC is the Motorola 6805U3. An output transistor 54 is connected to the micro-computer 50 and to the data port 66 for connection to an external device through the data port, as will be more fully described hereafter.

The converter 34 includes a FSK demodulator 56 which demodulates RF addressing signals. The specific FSK demodulator used is not critical, and any suitable demodulator may be used. A typical FSK demodulator is described in more detail in connection with FIG. 4.

A tuner 58 is shown which includes a splitter 60 and tuner circuitry 62. The splitter 60 has its input connected to the RF input port 64. One output of the splitter 60 provides the FSK signal to the FSK demodulator 56. The other output of the splitter 60 is connected to the tuner circuitry 62 which consists of analog circuits for video/audio signal processing. The tuner 58 may be of conventional design and is not critical for purposes of the present invention.

The converter 34 also includes a power supply 68 which is connectable to an external source of ac power by means of plug 70. The power supply 68 provides the D.C. voltages for operating the aforementioned elements or components of the converter 34.

Figure 3:
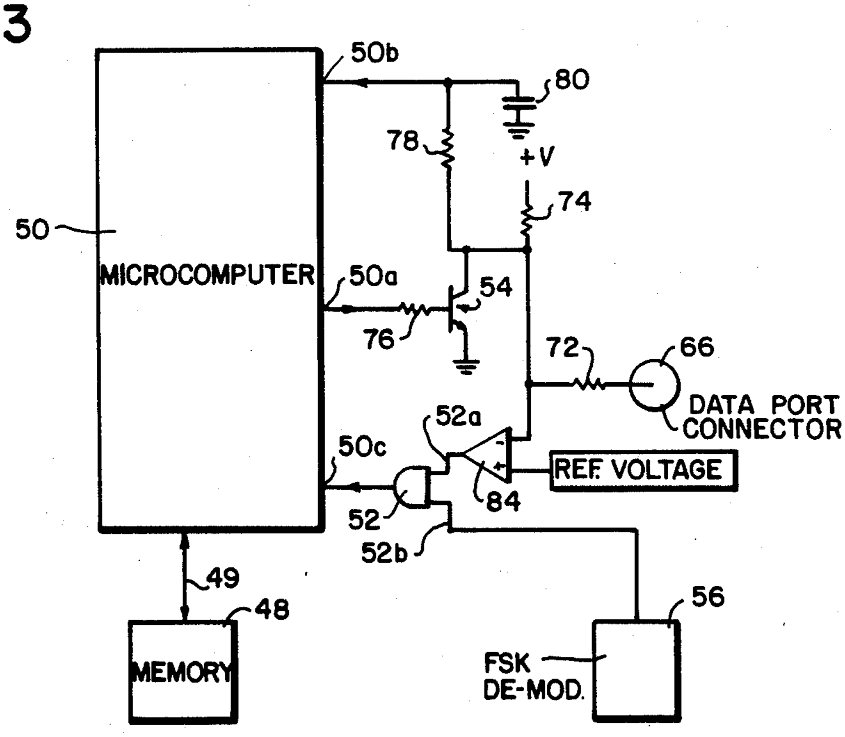
FIG. 3 is a block diagram, partially in schematic, of the circuitry asociated with the converters digital data port.

Referring to FIG. 3, those portions of the converter 34 which are associated with the converter digital data port are shown. The data port connector 66 is made readily accessible without the need for dismantling the converter 34. This data port connector may, for example, be a "F" connector and is advantageously accessible on the rear panel of the converter. Serial digital data exchanged with the converter 34 by some external device is accomplished through the data port connector 66.

The data port connector 66 is connected to a resistor 72 which is included to protect the internal circuitry from static discharge and current surges through the data port connector.

In the collector circuit of transistor 54 there is provided a resistor 74 by which the converter 34 can output a high state on the data port connector 66, resistor 74 being used as a "pull up" resistor. In the base circuit of the transistor 54 there is provided a base resistor 76 which is connected to an output **50*a* of the micro-computer 50**.

The converter 34 outputs data to the data port connector 66 by controlling the output **50*a* of the micro-computer. The data is conveyed from the micro-computer output 50*a* to the data port connector 66 through the transistor 54. The resistor 76 is included to limit the base current of the transistor 54. The micro-computer output 50*a* controls the transistor 54 such that the transistor is either operating in its cutoff or saturated region. To output a logic "1" on the data port connector 66, micro-computer output 50*a* is reset which causes the transistor 54 to be cutoff. To output a logic "0" on the data port converter 66, the micro-computer output 50*a* is set which places the transistor 34** in saturation.

When a converter 34 is used in a master-slave application and is functioning as a slave, data transmitted by the master is received by the micro-computer at input **50*b*. Resistor 78 and capacitor 80 form a low pass filter to remove noise from the signal at the input 50*b*. In reducing the circuit to practice an improvement in the rise or fall time of the signal may be appropriate in which event, a voltage comparator (not shown) may be needed to apply the signal to input 50*b***.

A further input **50*c* of the micro-computer 50 decodes RF commands delivered over the CATV distribution system (RF signal from the CATV distribution system is first demodulated by the FSK demodulator 56 within the CATV converter). The input 50*c* also decodes baseband commands applied to the digital data port connector 66 by an external device as to be more fully described hereafter. Commands delivered at baseband by an external device must conform to the same timing and protocol specifications as the baseband signal output by the addressing computer 14. This permits one software decoding routine in the micro-computer 50** to decode commands received from either source.

The "AND" gate 52 is used to transfer data from the FSK demodulator 56 or data applied to the data port connector 66 to the micro-computer input **50*c*. To route a signal appearing at either input of the AND gate to the micro-computer input 50*c***, the other AND gate input must be high continuously.

Data applied to the data port connector 66 is processed through a voltage comparator 84 prior to the AND gate 52 input. This voltage comparator 84 improves the rise/fall time of the received signal. The FSK demodulator 56 internal to the converter 36 is designed such that the data output remains in a high state continuously when an RF signal in the passband of the demodulator is not present. Thus, when an external device transmits commands via the converter data port connector 66, it must insure that RF signals in the passband of the FSK demodulator 56 are not applied to the converter 34. This assures that the input **52*b* of the AND gate 52 is high, enabling transfer of data from the data connector 66 to the input 50*c* of the micro-computer 50**.

When the converter 34 expects to receive commands from an external device via the data port connector 66, output **50*a* of the micro-computer 50 must be low so that the transistor 54** is cut off.

When the converter 34 must process data output by the FSK demodulator 56, the input to the voltage comparator 84 must be low so that the input **52*b* of the AND gate is high. This is accomplished in one of two ways, depending on the particular application of the data port 66. Either the data port 66 can be grounded by an external device or the converter 34 can assert micro-computer output 50*a***.

The micro-computer 50 which controls data transfer via the digital link also controls the converter 34 memory 48. This enables the micro-computer 50 to alter memory in response to commands received. The micro-computer 50 can also fetch data from memory 48 (without altering memory) and return the data via the digital data link.

Descriptions of usage of the digital data port connector 66 for each application is provided in the text that follows.

Figure 4:
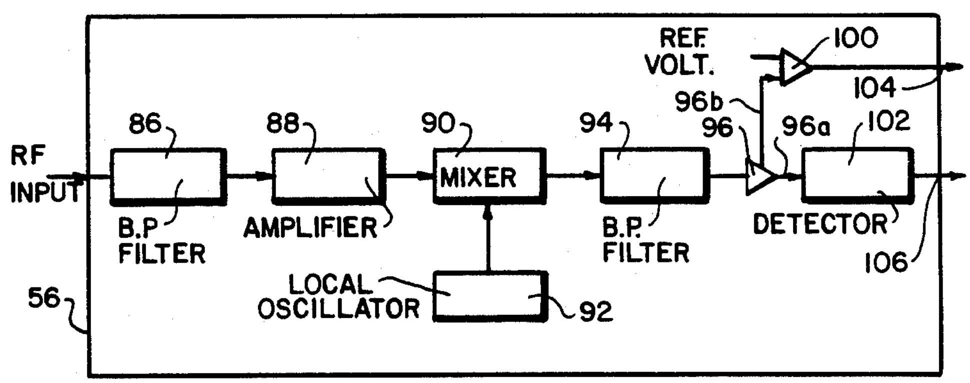
FIG. 4 is a detailed block diagram showing the internal elements of the FSK demodulator shown in FIG. 2.

Referring to FIG. 4, there is shown an FSK demodulator 56 of the type which can be used. The demodulator 56 accepts at its input a frequency shifted keyed modulated signal (FSK). The demodulator 56 has two outputs. The first output 104 provides a carrier-detected signal in the form of a digital output which indicates the presence or the absence of an RF input. The second output 106 provides a data-detected or baseband addressing signal.

The demodulator 56 has a bandpass filter 86 which passes the desired RF signals and rejects signals above and below the desired signals. An amplifier 88 amplifies the signals from the filter 86 prior to feeding same to a mixer 90 where the signal is mixed with a local oscillator 92 signal. The frequency of the local oscillator 92 is selected such that the input frequency is converted to an intermediate frequency (IF). The output of the mixer may, for example, have an IF frequency of 10.7 MHz. The output of the mixer 90 is fed to a bandpass filter 94 which is similar to the filter 86 except that it is centered at the IF frequency.

An amplifier 96 receives the IF signal from the filter 94 and provides an amplified IF signal at one of its outputs 96*a*, while the second output 96*b* is used to derive a carrier detect signal. The second output 96*b* is a D.C. signal whose value is proportional to the RF level at the FSK demodulator input.

A voltage comparator 100 compares the D.C. voltage output from the amplifier 96 with a reference voltage, the output of the voltage comparator forming a carrier detect output.

The first output 96*a* of the amplifier 96 is connected to a detector 102 which is a frequency discriminator. Its output 106 is a voltage which is proportional to the frequency of the input signal.

The carrier detect output 104 is a digital output. One state indicates that a RF signal in the passband of the FSK demodulator is present at the FSK demodulator input at sufficient level for proper operation. The other state at the output 104 indicates that the level of the RF input is insufficient for proper operation. During the conditions of insufficient RF levels the output 106 remains high continuously.

Connection of Converter With External Device

An important feature of the data port 66 is its ability to connect the converter 34 to external devices 108, including a technician set-up unit (TSU), to be more fully discussed below.

Figure 5:
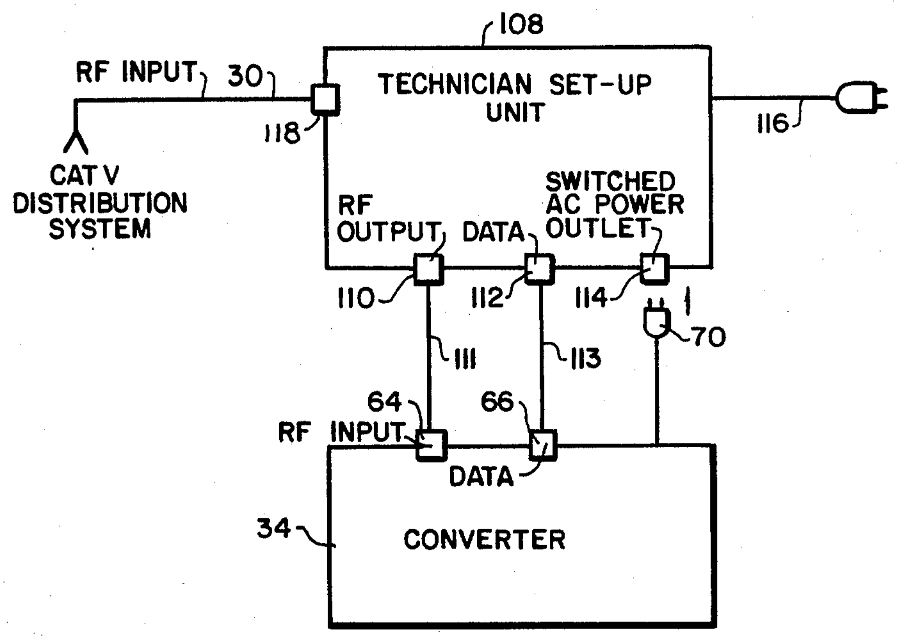
FIG. 5 is a block representation illustrating the connection between a converter and a technician set-up unit.

FIG. 5 illustrates how an external device 108, such as a technician set-up unit, connects to the converter 34 and communicates with the converter 34 via an RF link 111 as well as a digital data link 113. Also referring to FIG. 6, the external device 108 is shown to include a control element 109 to which there is connected an open-collector transistor 120 for outputting data and a buffer 122 for receiving data. The external device 108 contains a source of RF addressing signal, although this is not a requirement. If the external device 108 does contain an RF source, it can either be generated directly by the device (as may be the case for equipment developed for manufacturing) or the RF signal may be generated by another source such as from the CATV distribution system as to be fully described. However, regardless of the means by which the external device 108 provides the RF signal, it must be capable of interrupting RF to the converter 34. A switch 124, which can be of the electrical or mechanical type, is shown within the external device 108 for this purpose.

The converter 34 must be placed in a test mode of operation by the external device 108 before proper communication between the converter 34 and the external device 108 can occur. The details associated with placing the converter 34 into a test mode will be more fully described hereafter.

Figure 6:
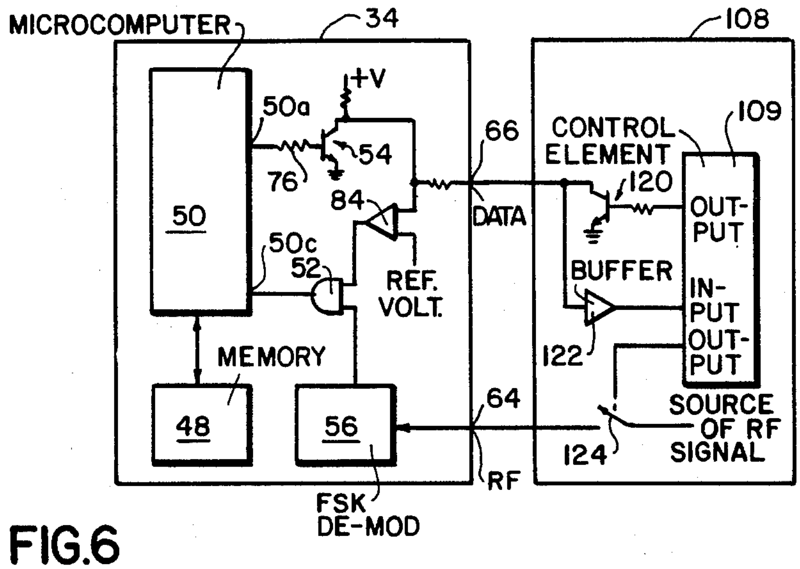
FIG. 6 is a block diagram of an external device connected to a converter.

After being placed in the test mode, the converter 34 ignores all data at the micro-computer input 50*b* and outputs a low signal at micro-computer output 50*a*. A low signal at the output 50*a* turns transistor 54 off thereby "freeing" the data link for control by the external device 108. The external device 108 can deliver baseband commands at the data port connector 66. Alternatively, it can provide RF commands to the converter's RF input 64, as shown in FIG. 6. The technician set-up unit, to be described, utilizes both means for sending commands to the converter 34 during converter installation.

Technician Set-up Unit

Figure 7:
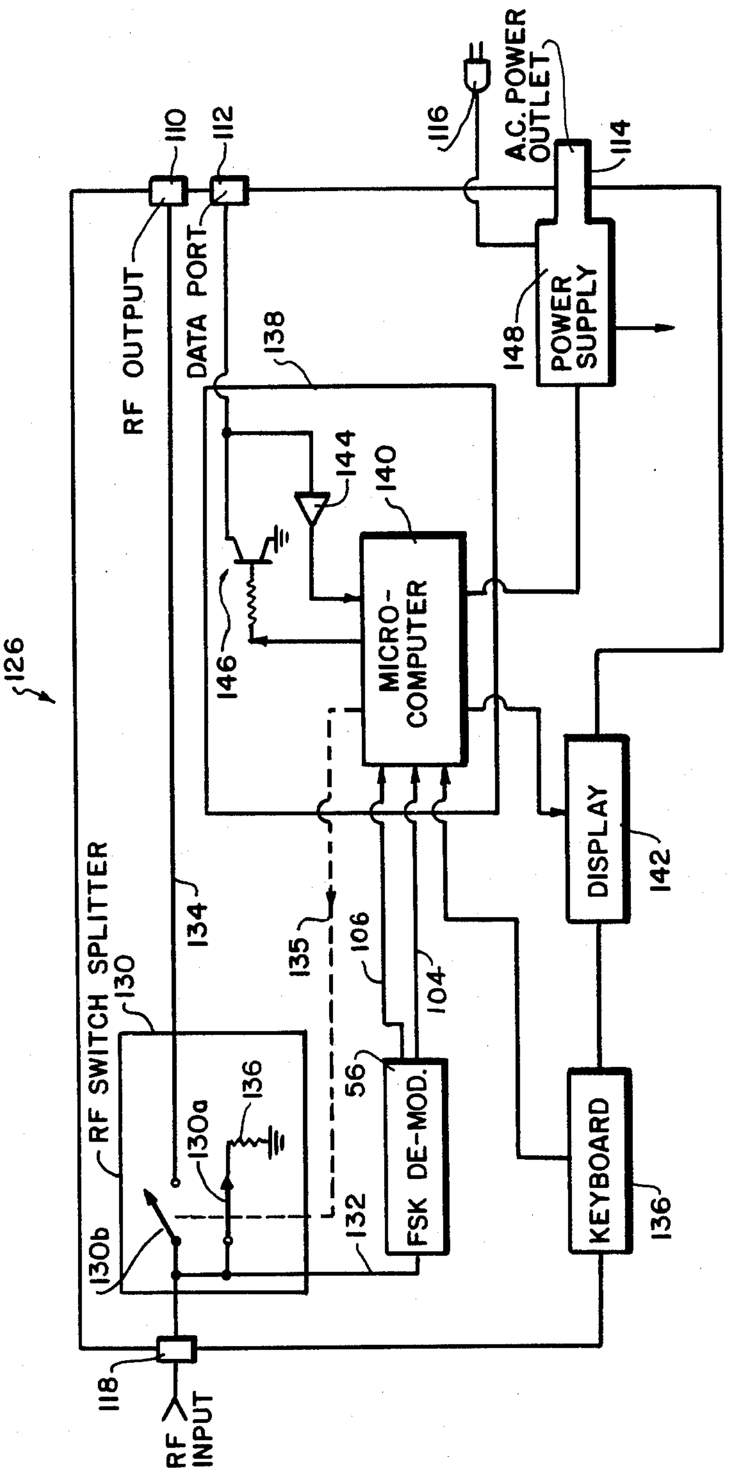
FIG. 7 is a detailed block diagram of a technician set-up unit which is intended to be used with the data port shown in FIG. 3.

One of the important functions of the data port 66 of the converter 34 is to provide access to the memory 48 for reading or verifying, setting up or modifying the data stored therein. This is accomplished with an external device which will be referred to in this application as a technician set-up unit which is generally designated by the reference numeral 126 in FIG. 7. The technician set-up unit 126 has an RF input 118 which is connectable to the cable 30 from the cable system 10. During converter installation, the addressing signal (FSK signal) is the only signal of interest of all of the signals transmitted on cable 30.

The RF input 118 is connected to an RF switch/splitter 130 which has two outputs 132, 134. One output 132 provides an FSK signal to an FSK demodulator 56 within the technician set-up unit. This output is applied to the FSK demodulator 56 which, in turn, applies the demodulated signal to the micro-computer 140. The second output 134 is switched under the control of the micro-computer 140 as suggested by the dashed line 135. This enables the technician set-up unit to apply/interrupt the FSK addressing signal to the converter 34.

The switch/splitter 130 conceptually contains two switches. When one switch 130*a* is closed, the other switch 130*b* is opened. This arrangement insures that the RF input is always terminated with the proper impedance (e.g. 75 OHMS). The termination of the matching impedance is provided either by the resistor 136 in the switch/splitter 130 or the equivalent input impedance of the converter 34.

The FSK demodulator 56 is used to demodulate the FSK signal which conveys addressing commands from the addressing computer 14. One output 106 of the FSK demodulator 56 is the baseband addressing signal which is decoded and processed by the micro-computer 140. The other output 104 of the demodulator 56 is a carrier detect output which indicates if an RF signal is present at the input of sufficient magnitude to permit proper operation.

A keyboard 136 is provided which the technician or installer uses to input control commands, including to turn the technician set-up unit on and off, to enter his identification number and to initiate the converter installation process.

The technician set-up unit 126 includes a controller 138 which provides the "intelligence" for the technician set-up unit. The controller 138 includes a micro-computer 140 which is the control element for the controller. The controller 138 decodes and processes addressing commands; monitors and processes the keyboard 136 inputs; controls the switched A.C. outlet 114, RF switch 130 and a front panel display 142; and communicates with the converter 34 via the converters bi-directional data port 66.

The controller 138 includes an input buffer 144 and an output transistor 146 which provides two-way communication with the converter 34 via the data port 112.

The controller 138 contains a non-volatile memory (not shown) into which the permanent portion of the technician set-up unit address is programmed. The permanent address is programmed during manufacture of the technician set-up unit.

Figure 8:
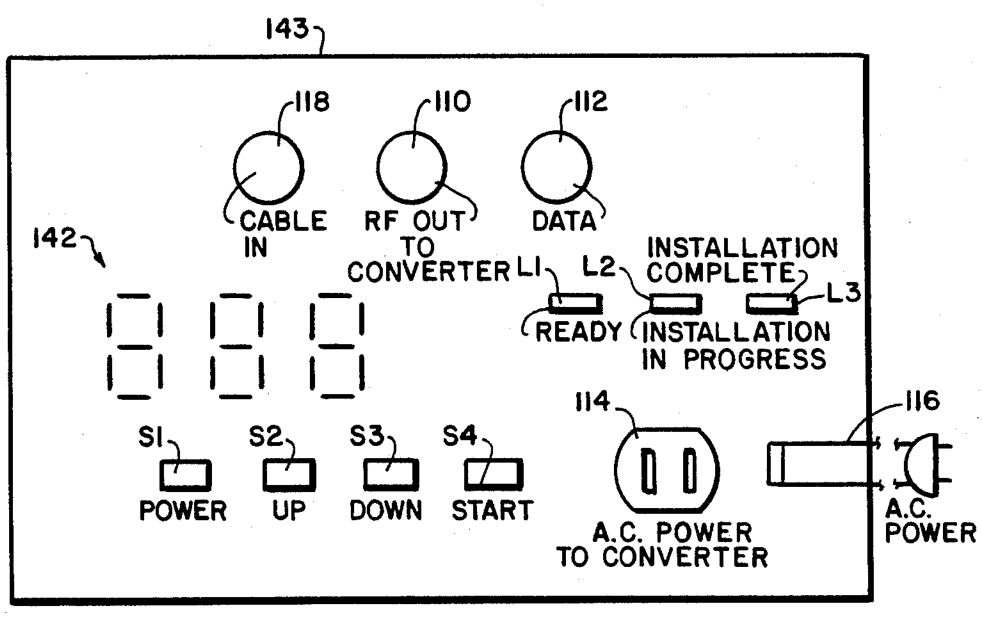
FIG. 8 is a front elevational view of the front panel of a technician set-up unit of the type that may be used with a converter as suggested in FIG. 5.

Referring to FIG. 8, a front panel 143 is shown which includes display 142 which provides feedback for user inputs and displays the status of the technician set-up unit. The display 142 may be in the nature of a three digit read-out display 142 which can display an identification number input by an installer as part of the installation procedure. The installer's identification number forms a portion of the technician set-up unit address. The display also includes three annunciators L1, L2 and L3 which provide feedback to the installer of the operating status of the technician set-up unit. Also provided are power switch S1, display digit up and down incrementing switches S2, S3 and start switch S4 which are used to control the operation of the technician set-up unit.

A power supply 148 provides all D.C. power for the technician set-up unit operation. The power supply 148 contains an A.C. relay which switches the A.C. power to a front panel output 114.

The RF output 110, thus, provides a switched RF output which is applied to the converters RF input 64. Similarly, the data port 112 of the technician set-up unit is used to provide two-way digital communications with the converter data port 66.

Installation Procedure Utilizing Technician Set-up Unit

The procedure for using a technician set-up unit to install a converter will now be described. The description that follows includes activities of the installer and dispatcher as well as activities automatically performed by the technician set-up unit 126, the converter 34 or the addressing computer 14. The dispatcher inputs data to the addressing computer 14 using a standard computer terminal (not shown). The installer makes all appropriate technician set-up unit/converter connections.

Initially, the installer connects the technician set-up unit 126 to the converter 34 by connecting a cable 30 to the technician set-up unit RF input 118, as suggested in FIG. 5. A cable 111 is also connected between the technician set-up unit RF output port 110 and the converter's RF input port 64. A cable 113 is similarly connected from the technician set-up unit "data" connector 112 to the converter's "data" port or connector 66. The converter's A.C. power cord 70 is plugged into the technician set-up unit's switched A.C. power outlet 114. Finally, the technician set-up unit's power cord 116 is plugged into any available A.C. outlet.

The installer turns the technician set-up unit on using the front panel power switch S1. The technician set-up unit performs diagnostic tests on circuitry internal to the technician set-up unit. If a diagnostic test fails, the technician set-up unit renders itself inoperative and the installation process is terminated. If diagnostic tests pass, the installation process continues with the technician set-up unit taking action to place the converter into a test mode of operation as follows.

The technician set-up unit opens the RF switch 130, thereby interupting RF signals to the converter 34. Also, the technician set-up unit applies A.C. power to the converter 34 and establishes communications with the converter via the bi-directional data port 66. This places the converter 34 in a mode of operation to communicate with the technician set-up unit and accept data from the technician set-up unit which defines the converter address. The sequencing of A.C. power to the converter 34 and the establishment of a communication link are such that the presence of more than one converter 34 can be sensed by the technician set-up unit. This is included to prevent the unauthorized, simultaneous installation of more than one converter.

If proper communication with a converter is established, the converter continues to communicate with a technician set-up unit and engage in the installation process, but is rendered inoperative in all other respects, i.e., it cannot be used in the standard mode of operation for processing video signals. Upon successful completion of the installation process, the converter becomes enabled for normal use by the subscriber. If proper communication with the converter is not, however, established the installation process is terminated and the technician set-up unit displays an "Error Code" on the front panel display 142 which indicates the reason for the premature termination of installation.

The technician set-up unit flashes a front panel annunciator L1 labeled "Ready." This serves to indicate to the installer that the technician set-up unit is ready to accept the installer's I.D. number.

The installer inputs his I.D. number using the front panel keyboard 136 including the "up" and "down" buttons or switches S2, S3 for increasing or decreasing, respectively, the number exhibited on the display 142. The installer uses the switches S2, S3 until he matches the exhibited number with his I.D. number.

The installer thereupon depresses a "Start" switch S4 on the technician set-up unit front panel. One portion of the technician set-up unit address is derived from the I.D. number input by the installer. A second portion consists of data programmed into technician set-up unit memory during manufacture. The technician set-up unit then lights the "Installation In Progress" annunciator L2 and the technician set-up unit awaits commands from the addressing computer 14. The installer thereupon contacts the dispatcher, using a telephone or two-way radio, and notifies the dispatcher of the subscriber's name, the installer I.D. number and converter serial number. The dispatcher enters data into the addressing computer 14 to initiate the installation process. This data consists of the information provided to the dispatcher by the installer.

The addressing computer derives the address of the technician set-up unit as follows. A variable portion of the technician set-up unit address is set equal to the installer's I.D. number. The installer's I.D. number is checked for validity and if valid is used as a pointer to a look-up table containing the serial number of the technician set-up unit. The addressing computer 14 may execute an algorithm using the technician set-up unit serial number as input, to derive the fixed portion of the technician set-up unit address. The installation procedure is inhibited if the installer's I.D. number cannot be found in the look-up table.

Once the addressing computer has derived the complete technician set-up unit address, commands can be sent to the technician set-up unit by the addressing computer. The addressing computer 14 selects an address for the converter 34 from a list of available addresses.

The addressing computer 14 issues commands to the technician set-up unit which contain data that specifies the converter address. The addressing computer also issues a command to its technician set-up unit to indicate that the address specification portion of the installation process is complete. The addressing computer 14 waits a fixed time interval before transmitting additional commands associated with the specific converter installation. Upon receiving the command, the technician set-up unit verifies that all necessary commands required to specify the converter address were actually received. If all required commands were not received, the installation process is terminated, the technician set-up unit displays an error code indicating the reason for premature termination and the converter is rendered inoperative. If all the required commands were received, the technician set-up unit downloads the converter address to the converter via the bi-directional data port 66. The converter address is encoded before being transmitted from the technician set-up unit to the converter. It is also stored in the converter in encoded form. This completes the first phase of the installation procedure.

The second phase of the installation procedure involves the technician set-up unit 126 activating the RF switch 130 to apply an RF signal to the converter 34. The RF switch is activated before the aforementioned time interval in the addressing computer terminates to insure that the converter receives all the commands from the addressing computer. The addressing computer 14 transmits commands to the converter. These commands provide all data required to completely configure the converter for operation in the subscriber's home. The converter is able to respond to these commands since it now has a defined address. Since the technician set-up unit knows the converter's address, the technician set-up unit processes the commands sent to the converter and establishes a data base which is equal to the data base being developed in the converter. The addressing computer 14 thereupon transmits a command to the technician set-up unit indicating that transmission of all addressing commands to the converter is complete.

In a third phase, the technician set-up unit opens the RF switch 130, removing RF from the converter 34. The technician set-up unit reads all of the data stored in the converter via the bi-directional data port 66. Data received from the converter is compared to the data stored in the technician set-up unit as a result of processing the addressing commands sent to the converter. This constitutes the verification phase of the installation process. If verification is successful, a final command is sent from the technician set-up unit to the converter over the bi-directional data port 66 to render the converter operable and the technician set-up unit annunciator L3 labeled "Installation Complete" becomes lit. Otherwise, the converter 34 is maintained in an inoperable state and the technician set-up unit displays an "Error" code.

The RF output port 110, thus, provides a switched RF output which is applied to the converter's RF input 64. Similarly, the data port 112 of the technician set-up unit is used to provide two-way digital communications with the converter data port 66.

The converter 34 contains a non-volatile, electrically alterable memory 48 for storing the converter address. Control circuitry within the converter 34, is capable of reading data in the memory 48 and is also capable of altering the data stored in the memory. Converters are preferably shipped with no address assigned. The assignment of addresses to converters 34 occurs after the converters are received by the CATV operator. The converter installation procedure, including address assignment, is controlled entirely by the addressing computer 14.

During the address assignment/installation procedure, the converter must be connected to the technician set-up unit 126. The technician set-up unit 126 is capable of processing RF addressing commands which are delivered over the CATV distribution system. Under control of the technician set-up unit, the RF switch 130 can be controlled to apply/interrupt RF commands to the converter 34. Furthermore, the technician set-up unit is capable of communicating with the converter through the special bi-directional digital data port 66 provided on the converter 34. The converter can process baseband commands applied to the digital data port 66 as well as RF commands applied to the converter's RF input 64.

The complete installation process, as noted above, consists of three phases. During Phase 1, all converter/-technician set-up unit interconnections are made and commands are issued to the technician set-up unit by the addressing computer 14. These commands are processed by the technician set-up unit's only and are ignored by converters. The data conveyed within the technician set-up unit commands defines the address of the converter which is stored in technician set-up unit memory and subsequently downloaded to the converter over the bi-directional data link 113. During Phase 1, the technician set-up unit interrupts RF addressing commands to the converter.

During Phase 2, the technician set-up unit activates the RF switch 130 to apply RF addressing commands to the converter. Commands are then issued by the addressing computer 14 to the converter to provide all remaining data required to complete the installation process, such as the list of viewable channels. These commands are routed through the RF switch 130 in the technician set-up unit to the standard RF input 64 of the converter 34. Also, since the converter address is known by the technician set-up unit, the technician set-up unit monitors all commands sent to the converter and mimics the response of the converter to these commands. Thus, the technician set-up unit establishes a data base which should be equivalent to the data base established in the converter.

Phase 3 of the installation process begins after the addressing computer has completed transmission of commands to the converter.

During Phase 3, the technician set-up unit reads the data stored in the converter 34 (via the bi-directional data port 66) to verify proper installation. If the installation is verified, the technician set-up unit sends a final command to the converter 34 to render it operational. If verification fails, the converter is rendered inoperative. The converter is rendered inoperative if all of the steps of the installation procedure are not completed.

Operation of Data Port With External Devices

Figure 9:
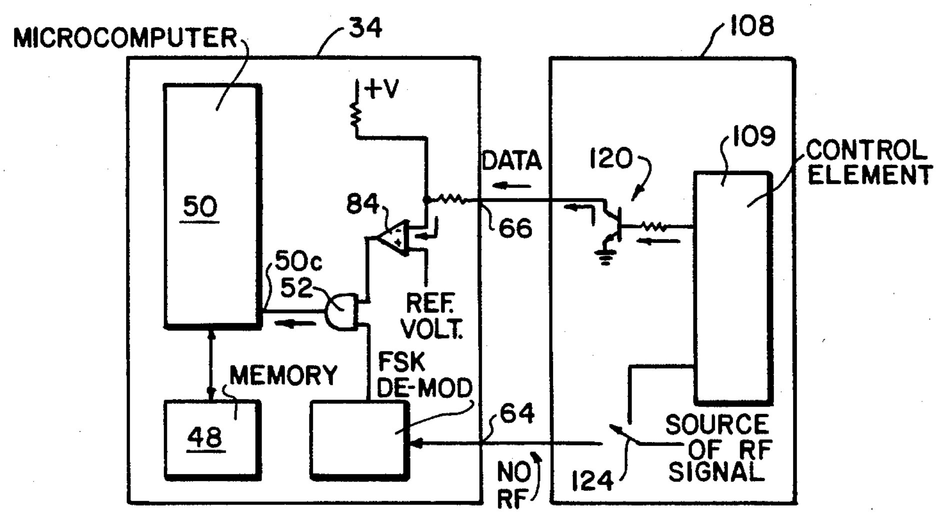
FIG. 9 is similar to FIG. 6, but showing the equivalent circuit illustrating the data path when data is sent from an external device to the converter via the digital data link.

To send commands to the converter 34 at baseband via the digital data link 113, the external device 108 must insure that RF signals in the passband of the converter's FSK demodulator 56 are not provided to the converter. An open-collector output in the external device can then be used to convey the command over the digital data link. The equivalent circuit for transferring data from the external device 108 to the converter 34 via the digital data link is shown in FIG. 9.

To send commands to the converter 34 over the RF link, the external device 108 must insure that the data signal applied to the converter's data port 66 is low. The equivalent circuit for transferring data from the external device 108 to the converter 34 via the RF link is shown in FIG. 10.

Data can be returned to the external device 108 by the converter 34 via the digital data link. However, the converter 34 assumes control of the data link to return data only in response to a command. The data is returned as soon as the command is processed and the data can be fetched from memory 48 by the micro-computer 50. Immediately after sending a command to the converter 34 directing the converter to return data, the external device relinquishes control of the data link. This provides an opportunity for the converter 34 to control the link and return data. Data is conveyed by the converter using the micro-computer output **50*a* and transistor 54. The equivalent circuit for transferring data from the converter to an external device via the digital data link is shown in FIG. 11**.

Just prior to and for a predetermined time period after application of A.C. power to the converter, by issuing appropriate signals to the data port connector 66 and RF input port 64, the converter 34 will be configured to operate in one of two modes: "Test" or "Normal" mode of operation. If "Test" mode of operation is established, the converter will remain in "Test" mode until A.C. power is removed. In this mode of operation, the converter will communicate with an external device via the data connector 66. During "Test" mode of operation, the converter does not implement the standard converter functions, such as processing video signals or communicating with another converter in master-slave operation. The "Test" mode is intended only for loading or reading data in converter memory by issuing commands to data connector or by applying an RF signal to the converter's RF input.

If "Normal" mode of operation is established, the converter will remain in "Normal" mode until A.C. power is removed. In "Normal" mode the converter implements standard converter functions, such as changing channels and processing video signals. In "Normal" mode, the converter will not permit an external device to read or alter memory via the data port. However, in "Normal" mode, communication between converters via the digital data link is permitted to implement the master-slave feature and the converter responds to RF addressing commands which alter memory locations related to level of service provided. Two modes of operation are defined to minimize the potential for a television subscriber or a "pirate" attempting to steal service (inadvertently or intentionally) by modifying the converter address or memory data through application of signals at the data connector 66.

Master-Slave Communication Between Converters

Figure 12:
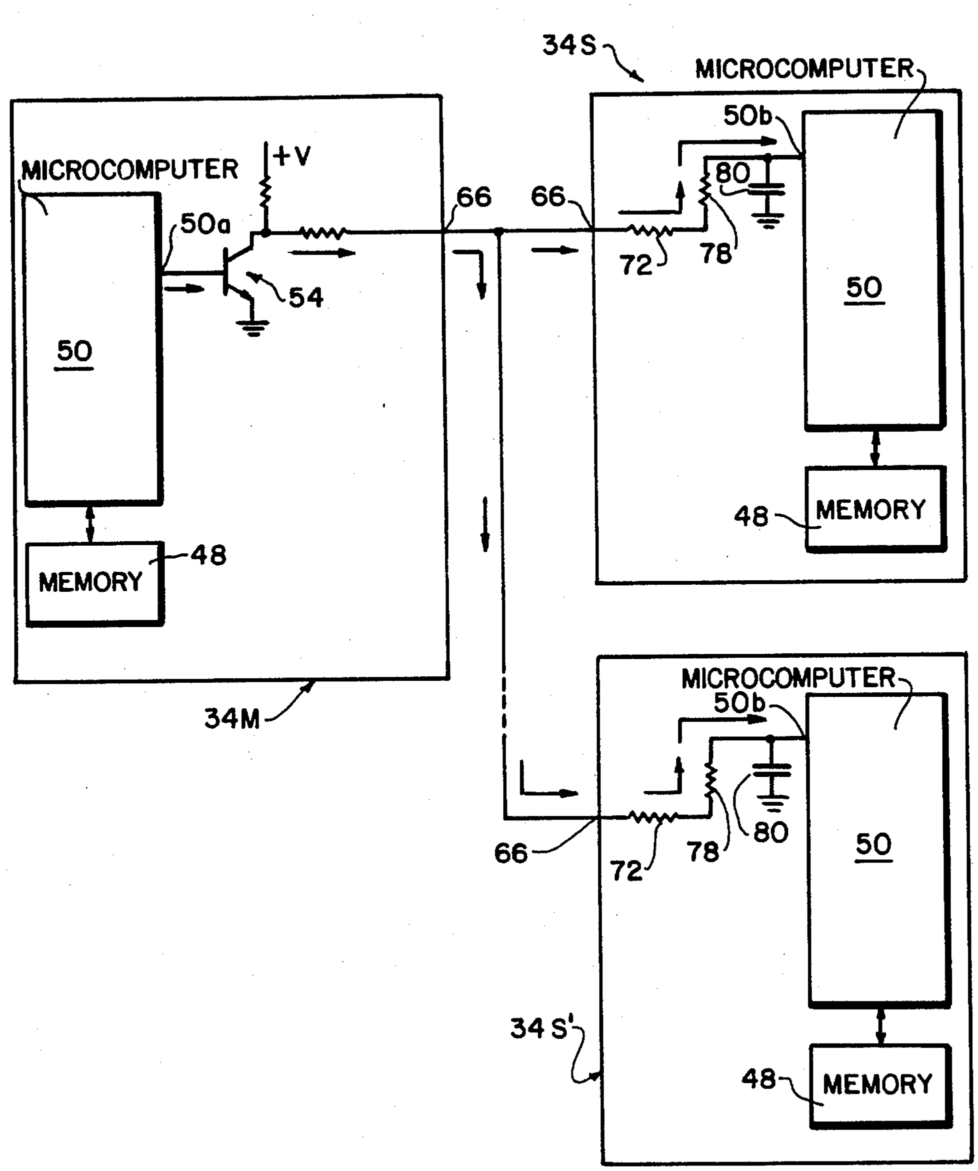
FIG. 12 illustrates three converters each of which is provided with a data port of the type shown in FIG. 3, with one of the converters serving as a master converter while the other two converters serve as slave converters.

Referring to FIG. 12, there is shown an arrangement in which a master converter 34M can send data to slave converters 34S and 34S' via the digital data link. This communication occurs only during normal mode of operation and only under direct control of the addressing computer 14. This is achieved in the following way. When a converter 34 is in the "Normal" mode of operation and not engaged in master-slave communication, the converter 34 outputs a high signal at microprocessor output **50*a*. A high signal at output 50*a* turns transistor 54 on, thereby inhibiting any signals at the data connector from propagating to microcomputer input 50*b* or 50*c* of the slave converters 34S, 34S'. This prevents the possibility of corrupting the FSK data signal, as seen by the micro-computer inputs 50*c*, by applying a signal through the data connector 66. This also insures that capacitor 80** is discharged prior to commencement of master-slave communication. Any of the interconnected converters can be transformed into master or slave converters by appropriate commands from the addressing computer.

To initiate communication between the master converter 34M and the slave converters 34S, 34S', the addressing computer 14 issues commands to configure each of the respective converters as masters or slaves. The addressing computer specifies the data to be transmitted from a master converter 34M to one or more slave converters. Also, the addressing computer 14 specifies the time at which the data transmission from a master converter to a slave converter commences. At the time specified by the addressing computer 14, data is transmitted by the master converter 34M over the digital data link. This is accomplished by controlling transistor 54 with micro-computer output **50*a*. Also, at the time specified by the addressing computer 14, the slave converter outputs a low signal at micro-computer output 50*b* which turn transistor 54 off and frees the data link for control by the master converter 34M. The slave converter then monitors the micro-computer input 50*b* for the appropriate data. See FIG. 12**.

Flow Charts (FIGS. 13–20)

Referring to FIGS. 13 and 14, two flow charts are shown side-by-side. FIG. 13 represents the software in the converter 34, while FIG. 14 represents the software in the technician set-up unit 136. The flow charts are arranged to convey how the processing in the converter and the technician set-up unit are related in time.

FIG. 14 shows the steps taken by the technician set-up unit to place a converter in the test mode and FIG. 13 shows the steps taken by the converter to determine if it should enter the test mode. As shown, and as discussed above, the technician set-up unit sends a predetermined data pattern to the converter 34 for two seconds, during which time no FSK signal is provided. All processing in the converter related to this task is performed in less than two seconds after A.C. power is first applied. A pre-determined data pattern is applied to the converter before A.C. power is applied to the converter. This will not damage the converter because the technician set-up unit uses an open collector output to send data to the converter.

It is important to note that the processing performed by the converter 34 as shown in FIG. 13 occurs one time only after each power-up. Furthermore, it occurs essentially immediately after the micro-computer 50 comes out of reset after power-up. This is why the technician set-up unit must be able to switch A.C. power to the converter and must establish the proper input conditions to the converter 34 prior to the application of A.C. power.

If the converter is not in test mode, it will not enter test mode until it is powered-down and then powered-up again with proper input conditions established (the proper input conditions are: (1) no FSK signal, and (2) pre-determined data pattern delivered to the data port 66). The constraints imposed on placing the converter 34 in test mode (providing the correct input conditions at the correct time) are included to minimize the chances of the converter entering test mode during normal subscriber usage.

Figure 15:
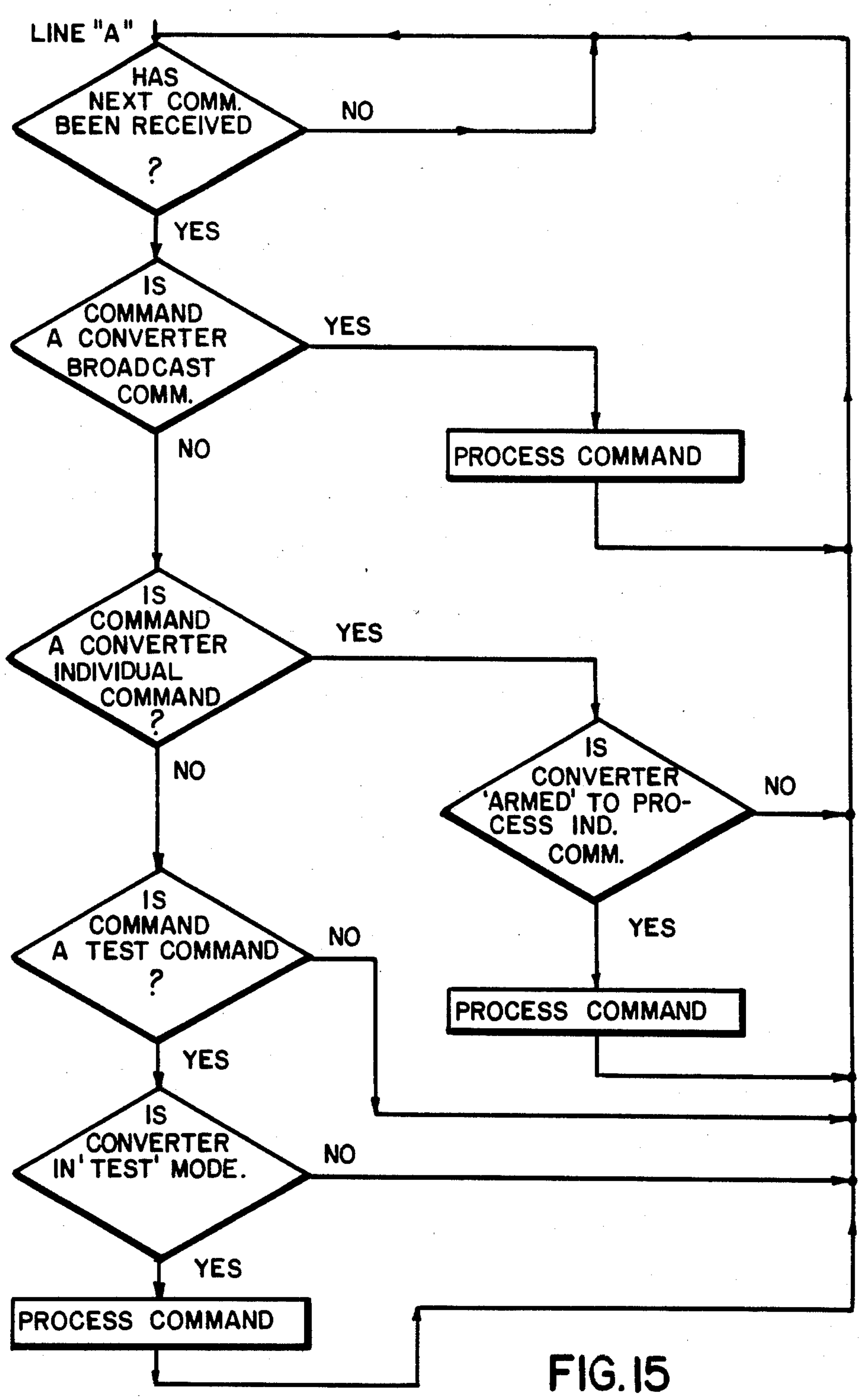
FIG. 15 is a continuation of the flow chart shown in FIG. 13, showing the sequences following the converter's determination as to whether it is in the test mode or not.

The flow chart shown in FIG. 15 is for the software in the converter 34, and is a continuation of the flow chart shown in FIG. 13 after the converter has determined if it is in the test mode or not. As will be noted, the converter 34 always processes converter specific or individual commands and converter global or broadcast commands, whether in test mode or not. The converter 34 always ignores technician set-up unit individual and broadcast commands. In the flow chart shown in FIG. 15, no check is made to see if a received command is a technician set-up unit command, thereby those commands are ignored. Test commands are processed only if the converter 34 is in test mode.

Thus, referring to FIG. 13, once the converter determines that the pre-determined data pattern for the technician set-up unit has been received and in the absence of an RF addressing signal, the converter enters the test mode at which time it responds to all addressing commands from the addressing computer and commands directed from the technician set-up unit. The converter is then in a condition to alter all memory locations as directed by the received commands, as more specifically shown in FIG. 15.

Figure 16:
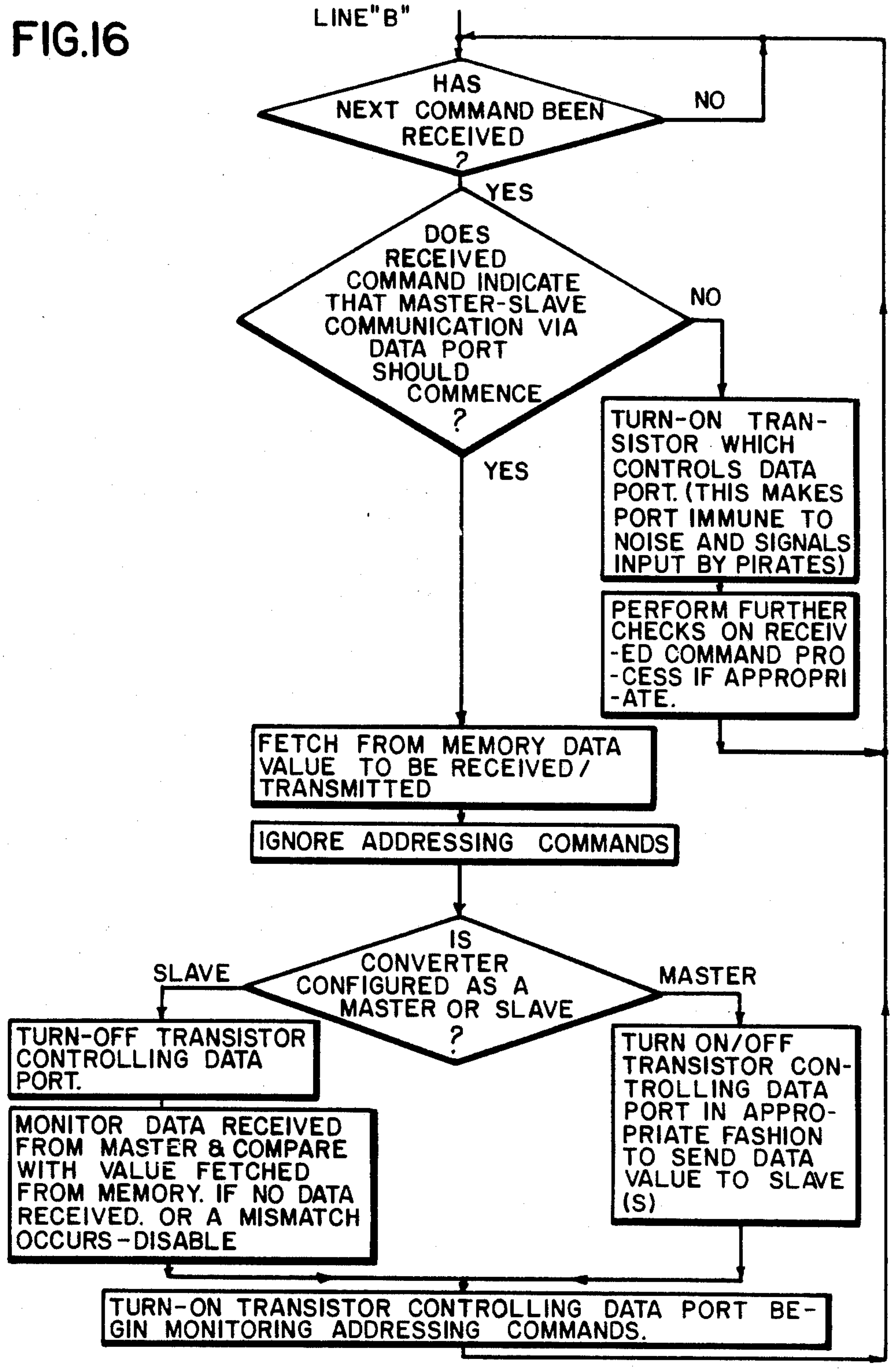
FIG. 16 is a continuation of the flow chart shown in FIG. 13, showing the sequences when the converter is not in the test mode, and also describes software for master-slave operation.

Immediately after power up, when an addressing signal is present or the pre-determined data pattern is not received, the converter does not enter the test mode, does not alter data in memory defining its converter address and implements normal processing for subscriber operation, as more specifically shown in FIG. 16. Following the last decisional element in FIG. 16, once the converter decides that it is configured as a slave converter, the transistor 54 is initially turned off until master-slave communications are completed. As noted, this is necessary to permit data from the master to pass through to the micro-computer in the slave converter.

The flow chart in FIG. 16 is a continuation of the flow shown in FIG. 13 when the converter is not in test mode. The flow chart also describes the software for master-slave operation.

The second decision element in the flow chart asks if the received command indicates that master-slave communication should commence. Prior to sending this command, the addressing computer 14 sends commands to configure each converter as a master or slave and to specify a data value. The data value is transmitted by master converters 34M. The data value specifies the data expected by a slave converter from its master. When the broadcast command referenced in the second decision element is received, it causes master converters 34M to begin transmitting data, thereby telling slave converters to expect to receive data from its master converter.

FIGS. 17–20 represent continuations of the flow chart shown in FIG. 14, each successive figure being a continuation of the flow charts shown in the previous figure.

Figure 17:
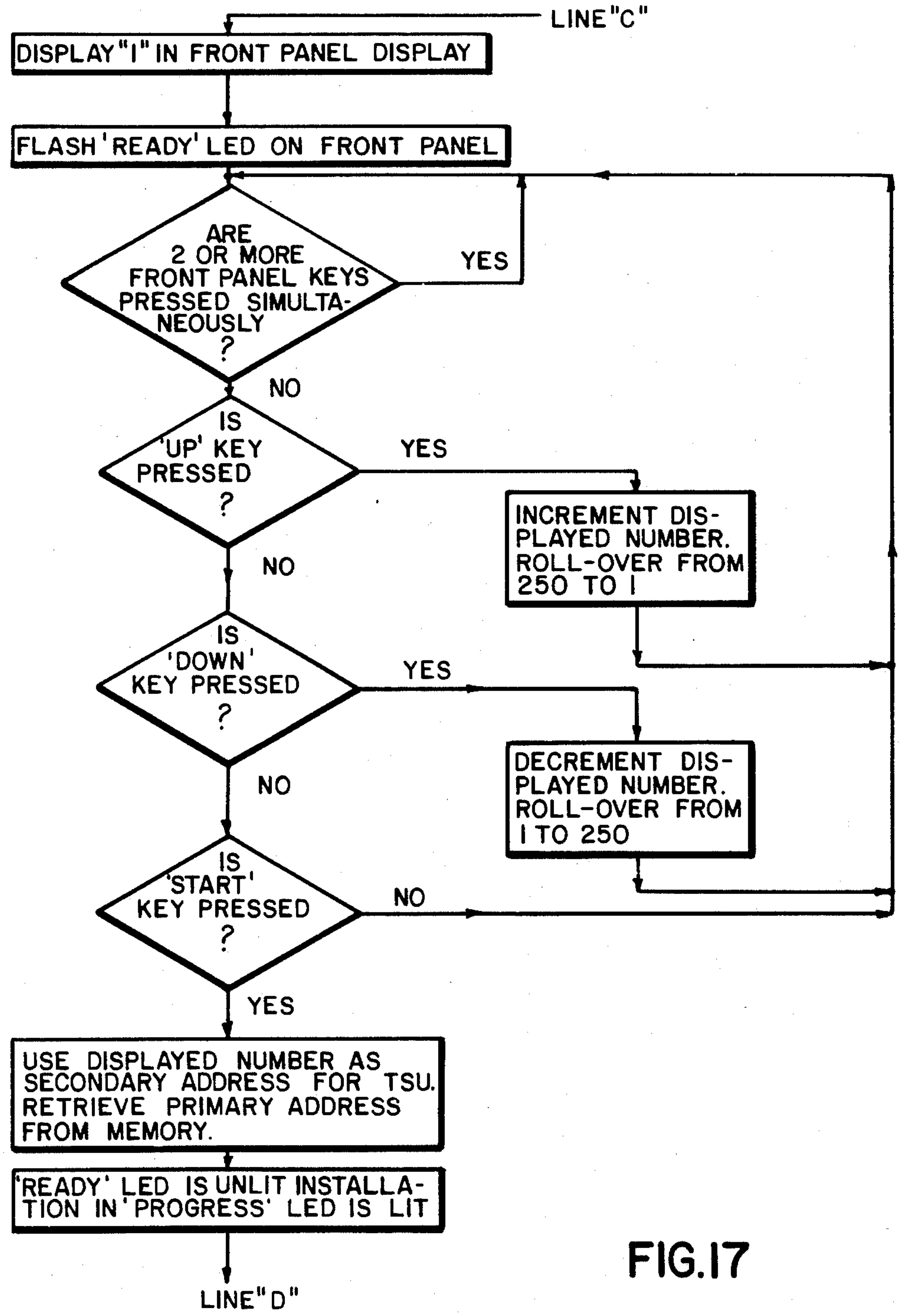
FIG. 17 is a continuation of the flow chart shown in FIG. 14.

Referring to FIG. 17, just prior to the first decisional element, when the "Ready" annunciator L1 flashes on the front panel 143, the user is notified that the I.D. number will be accepted by the technician set-up unit. During such entry, as indicated by the first decisional element in FIG. 17, when two or more keys are pressed simultaneously, the entered information is rejected and another attempt at entry must be made.

The second and third decisional elements in FIG. 17 are used to test the "Up" and/or "Down" switches S2 and S3. As previously noted, these switches are used to select the installer's I.D. number. As shown in FIG. 17, the system is programmed to display numbers 1 through 250 inclusively.

In order to render stolen technician set-up units and converters inoperative, both technician set-up units and converter addresses consist of two portions one portion of which is fixed and the other portion of which is variable and is entered by the installer and must match to receive commands from the addressing computer.

After the pressing of the "Start" key is confirmed in the last decisional element in FIG. 17, it will be noted that the primary address is retrieved from memory. In this connection, it is pointed out that the technician set-up unit primary address is stored in its memory when the technician set-up unit is manufactured. The secondary address is defined by the installer ID number.

Figure 18:
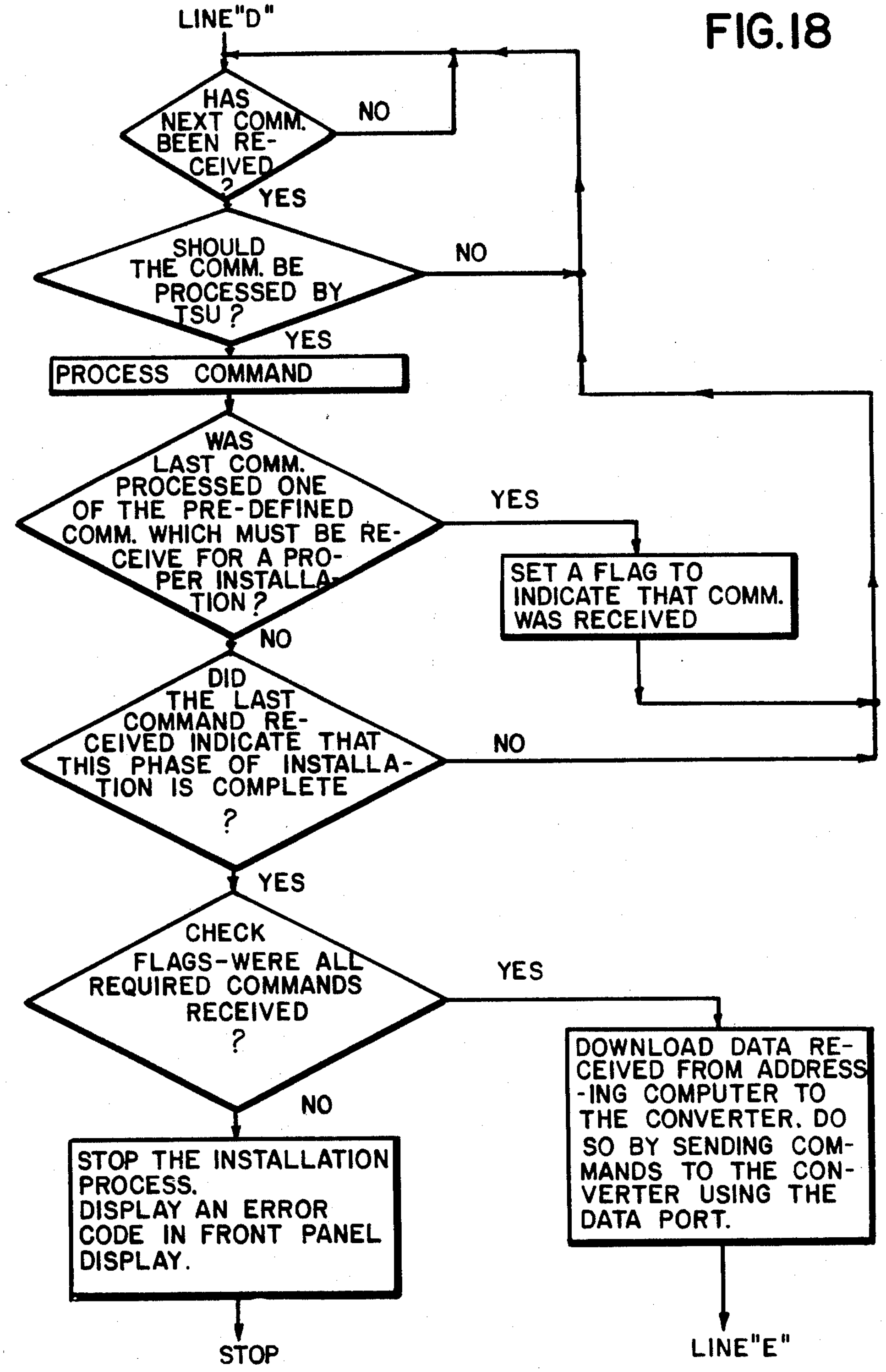
FIG. 18 is a continuation of the flow chart shown in FIG. 17.
Figure 19:
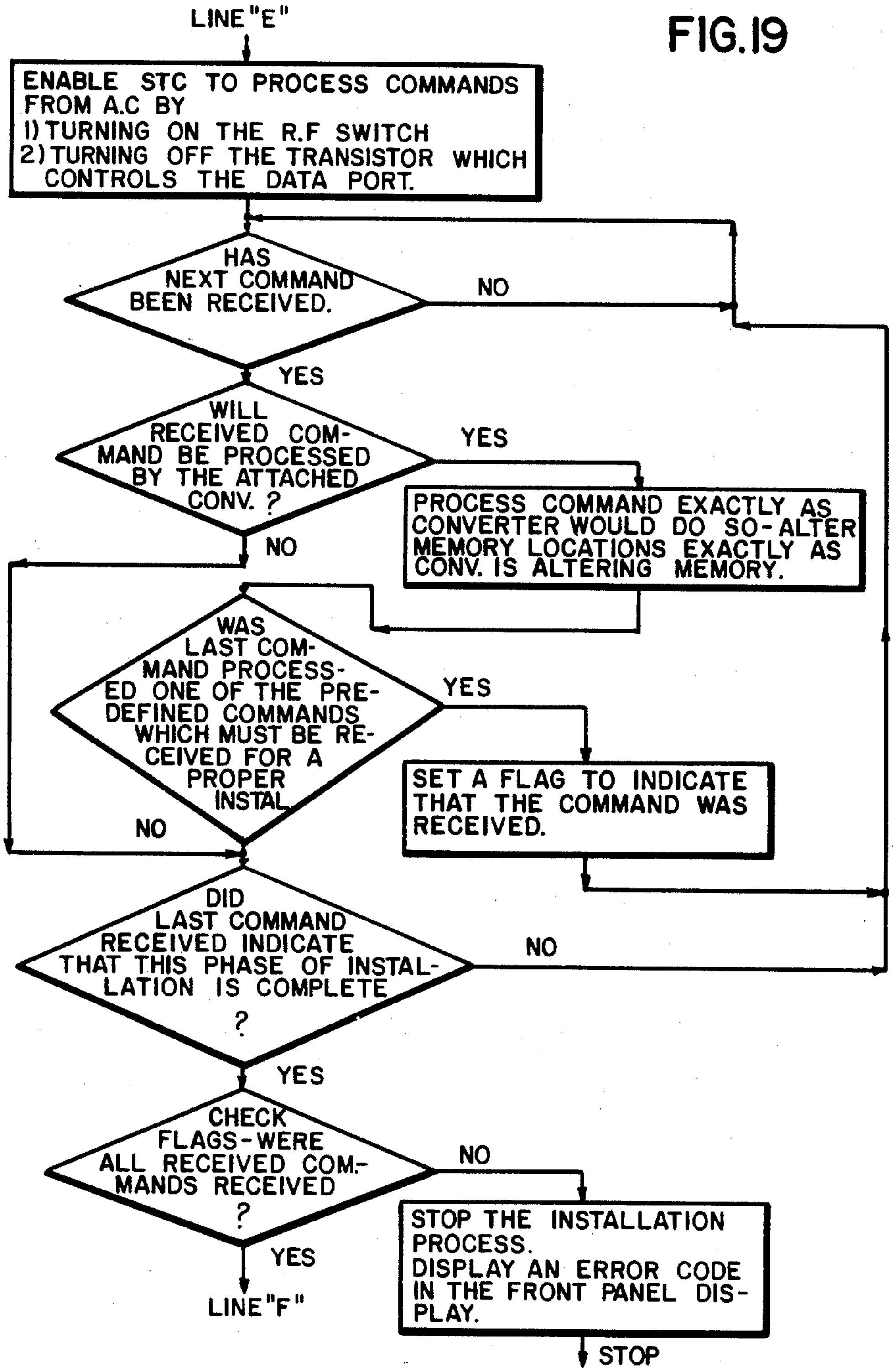
FIG. 19 is a continuation of the flow chart shown in FIG. 18.

Referring to FIG. 18, the first decisional element determines whether a command has been received to instruct the technician set-up unit to begin monitoring commands from the addressing computer 14. As will be noted in both FIGS. 18 and 19, the addressing computer 14 sends a command each time to indicate when all data to be sent in connection with a particular phase of installation is complete.

Figure 20:
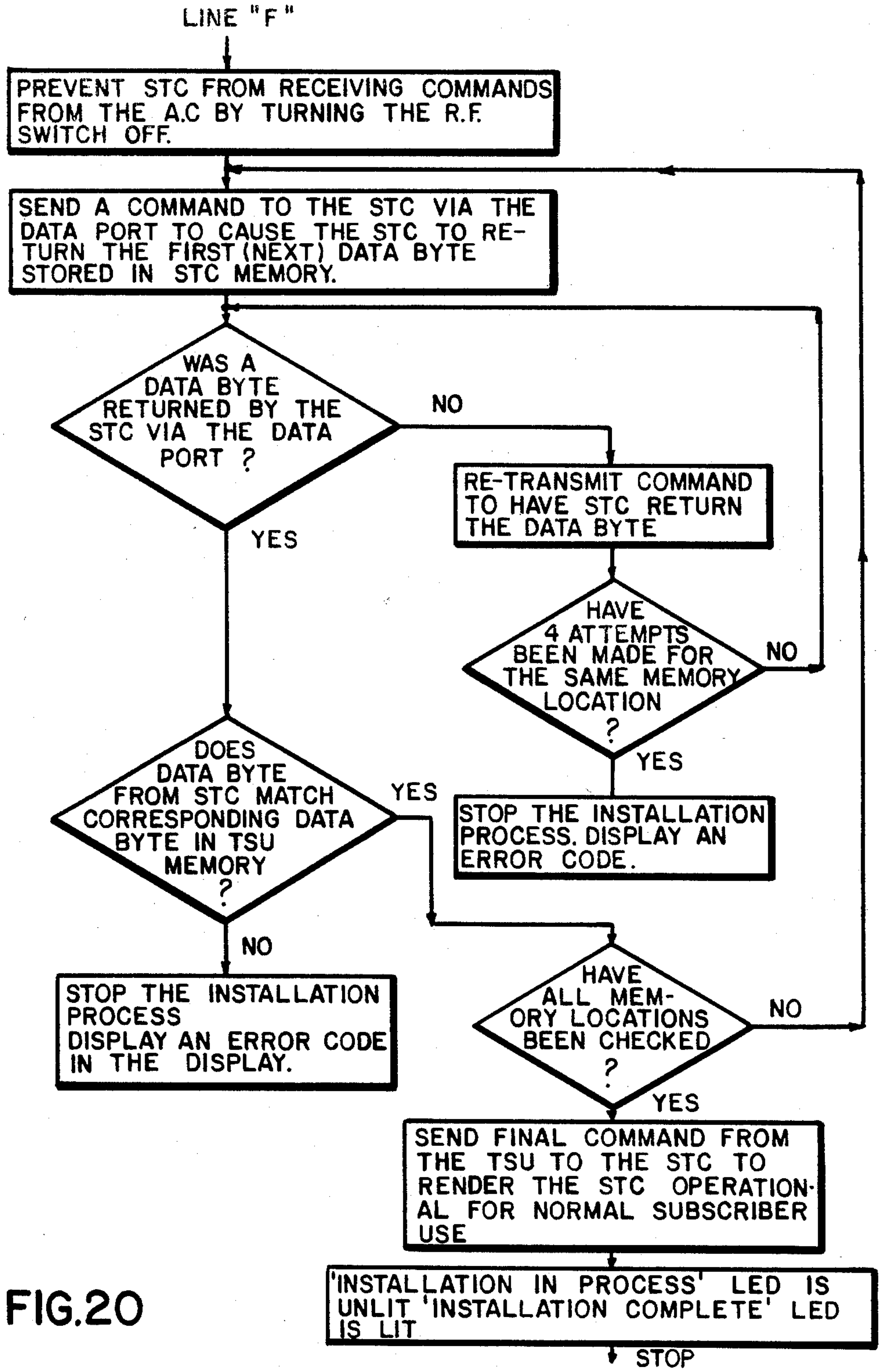
FIG. 20 is a continuation of the flow chart shown in FIG. 19.

In FIG. 20, it is noted that in the second decisional element, four attempts are advantageously made to obtain a data byte at a single location. If the set-top converter does not respond, the installation procedure is aborted.

In the flow charts, the letters "AC" stand for "addressing computer", "STC" represents "set-top converter" and "TSU" represents "technician set-up unit."

While there has been described a specific example of the implementation of the present invention, it will be apparent that changes and modifications may be made therein without departing from the invention in its broader aspects. The aim of the appended claims, therefore, is to cover all such changes and modifications as fall within the true spirit and scope of the invention.

What is claimed is:

1. A technician set-up unit for use during installation of an addressable television signal converter of a type having an RF input port, an AC power input and a data input port and being responsive to a television signal distribution system remotely controlled by an addressing computer which generates coded RF command signals, said unit comprising:

an RF input port for receiving said RF coded command signals and coupled via an RF switch to an RF output port that is temporarily connectable during installation of said converter to the RF input port of the converter;

a data port temporarily connectable during installation to the data port of the converter for receiving converter set-up digital data signals from and sending converter set-up digital data signals to said converter;

an AC power switch for temporarily providing switched AC power to said AC power input of said converter; and control means responsive to said RF coded command signals and to locally entered command signals in said technician set-up unit for coordinating the the operation of said RF and AC power switches and the exchange of digital data signals between said converter and said technician set-up unit through the respective connected RF, AC power and data ports during set-up of said converter.

2. A unit as defined in claim 1, wherein said RF command signals are modulated, and further comprising demodulating means associated with said unit RF input port for demodulating said RF command signals to a form acceptable by said control means.

3. A unit as defined in claim 2, wherein said control means comprises a micro-computer programmed to decode said command signals.

4. A technician set-up unit as defined in claim 1, wherein said unit data port is bi-directional and connected to said control means.

5. A technician set-up unit as defined in claim 1, wherein said control means comprises a micro-computer having a data input terminal, and a buffer between said unit data port and said micro-computer input terminal.

6. A technician set-up unit as defined in claim 1, wherein said control means comprises a micro-computer having a data output terminal, and a driver means for outputting data from said micro-computer output terminal and said unit data port.

7. A technician set-up unit as defined in claim 6, wherein said driver means comprises an emitter grounded transistor the base of which is connected to said micro-computer output terminal and the collector of which is connected tosaid unit data terminal.

8. A technician set-up unit as defined in claim 1, further comprising display means connected to said control means for displaying information to an installer during installation, testing or address assignment for the converter.

9. A technician set-up unit as defined in claim 1, wherein said control means includes means for storing a fixed logical address established during manufacture and for inputting a variable address specified by an installer using the technician set-up unit during the procedure of installing a converter.

10. A method of installing an addressable converter having an RF input port and a data port and a control element responsive to a televison signal distribution system remotely controlled by an addressing computer which generates coded RF command signals, the method comprising the steps of interrupting RF signals to the RF input port of the converter by a technician set-up unit; inputting a predetermined data pattern to the converter through its data port; applying power to the converter while said data pattern is being inputted to the converter; receiving RF command signals from the addressing computer which define the address to which the technician set-up unit is connected; and assigning and loading the address in converter memory.

11. A method of installing an addressable converter as defined in claim 10, wherein the RF commands are directed only to the technician set-up unit, whereby said commands are not recognized by the converters.

12. A method of installing an addressable converter as defined in claim 10, wherein the address information is downloaded from the technician set-up unit to a converter via the bi-directional data port.

13. A method of installing an addressable converter as defined in claim 12, monitoring and verifying the data by the technician set-up unit received by the addressing computer before downloading the address information to the converter.

14. A method of installing an addressable converter as defined in claim 10, further comprising the step of monitoring the commands sent to the converter with the technician set-up unit, and using the technician set-up unit to mimic the operation of the converter, whereby the technician set-up unit establishes a data base equivalent to that established in the converter.

15. A method of installing an addressable converter as defined in claim 10, further comprising the step of re-assigning a converter address when the converter is transferred from one location to another.

16. A method of installing an addressable converter as defined in claim 10, wherein said predetermined data is outputted for a predetermined interval of time.

17. A method of installing an addressable converter as defined in claim 16, further comprising the step of testing the ID number of the installer.

18. A method of installing an addressable converter as defined in claim 16, wherein the converter has a programmable memory and the converter addresses are assigned and loaded into the converter memory following entry by the converter into the test mode of operation.

19. A method of installing an addressable converter as defined in claim 10, wherein the converter has a programmable memory, and further comprising the step of verifying the data stored in the converter memory.

20. A method of installing an addressable converter as defined in claim 19, further comprising the step of disabling the converter and rendering it inoperative if verification fails.

21. A method of installing an addressable converter as defined in claim 19, further comprising the step of disabling the converter and rendering it inoperative if all of the steps in the installation procedure are not completed.

* * * * *